H. C. JONES.
AUTOMATIC SHUTTER DEVICE.
APPLICATION FILED MAY 20, 1915.

1,268,577.

Patented June 4, 1918.

INVENTOR
Harry C. Jones
BY
Kenyon & Kenyon
ATTORNEYS

UNITED STATES PATENT OFFICE.

HARRY C. JONES, OF LARCHMONT, NEW YORK.

AUTOMATIC SHUTTER DEVICE.

1,268,577.

Specification of Letters Patent.

Patented June 4, 1918.

Application filed May 20, 1915. Serial No. 29,258.

*To all whom it may concern:*

Be it known that I, HARRY C. JONES, a citizen of the United States, resident of Larchmont, Westchester county, State of New York, have invented new and useful Improvements in Automatic Shutter Devices, of which the following is a specification.

My invention relates to improvements in automatic shutter devices and more especially to shutter devices for cameras where it is desirable to vary the size of the stop opening during the exposure.

One object of my invention is to provide an automatic device by which the size of the stop opening will be automatically changed during a single exposure. By the term "single exposure" I mean the entire active exposure of the sensitive plate to the light prior to developing. In the photoengraving art it is important to divide such single exposure into several parts, each part being had with a different size or shape of stop or exposure opening. A further object of the invention is to provide mechanism by which the size of the stop opening may be gradually decreased during a single exposure, responsive to the lapse of time during the exposure. A further object of the invention is to provide means for varying the rate at which the changes or decrease in size of the stop opening will take place. A further object of the invention is to provide such an arrangement in which the exposure will be automatically discontinued. A further object is to provide such an arrangement in which the exposure is automatically started. A further object is to provide such an arrangement in which a special focusing opening is provided. A further object of the invention is to provide a simple and cheap apparatus for accomplishing the objects above mentioned in an efficient manner. Various other objects, features and advantages will more clearly appear from the detailed description given below taken in connection with the accompanying sheet of drawings which forms a part of this specification.

Figure 1:
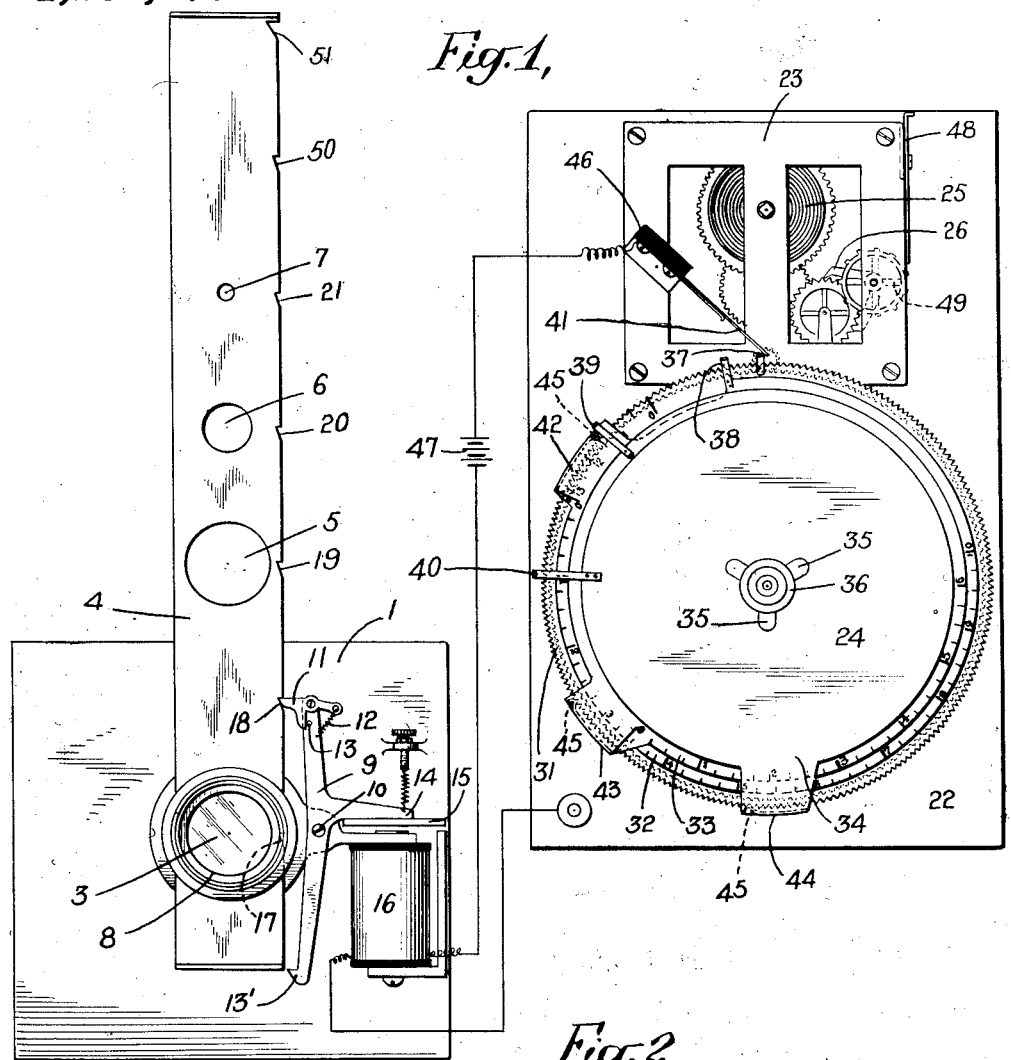

In the drawings, Figure 1 illustrates a shutter device embodying my improvements in one form, certain parts thereof being shown diagrammatically.

Figure 2:
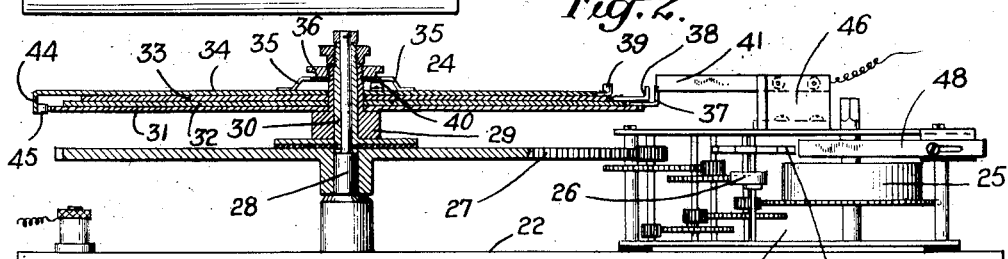

Fig. 2 is a section of the timing arrangement shown in Fig. 1.

Referring to the drawings, 1 may represent a camera of any suitable kind provided with a lens at 3 and a shutter 4, which shutter is provided with a plurality of stop openings 5, 6 and 7 of gradually decreasing size, and also with a focusing opening at 8. The shutter is adapted to drop by gravity to bring the various openings and blank spaces which shut off the exposure, opposite the lens, under the control of mechanism presently to be described. Pivoted adjacent the lens and shutter at 10, is an escapement lever 9 carrying on its upper end a pivoted dog 11 acted upon by a compression spring 12 to normally force the same against the stop 13 carried on the lever 9. At its lower end the lever 9 is provided with an integral dog 13'. Extending laterally from the lever 9 is an arm 14 carrying an armature 15 adapted to be attracted by an electromagnet 16 when the electromagnet is energized. The shutter 4 is provided with notches 17, 18, 19, 20, 21, 50 and 51, along one edge thereof, which notches are adapted to be engaged by the dogs 11 and 13, as is more specifically hereinafter set forth.

22 represents a base carrying the timing arrangement which comprises a clock arrangement 23 having an electrical contact arrangement 24.

The clock arrangement is provided with a main spring 25, the usual reducing gears and escapement 26, and is adapted to drive at a reduced uniform speed the gear 27 of the electrical contact arrangement. The gear 27 rotates about the shaft 28. Carried by the gear 27 and rotating therewith are sleeves 29 and 30. The sleeve 29 has a shoulder upon which rest four disks 31, 32, 33 and 34. These disks are loosely mounted about the sleeve 29 but are held in frictional engagement with one another and upon the shoulder and the sleeve 29 by means of spring arms 35, the pressure which they exert upon the disks 31, 32, 33 and 34 being adjusted by a thumb nut 36. The disks 31, 32, 33 and 34 carry electrical contacts 37, 38, 39 and 40 respectively, adapted to be successively engaged by an electrical spring contact 41 projecting from an upright on the clock arrangement. The disks 32, 33 and 34 carry overhanging extensions 42, 43 and 44 respectively, the disk 31 being serrated at its edge and each extension 42, 43 and 44 carrying with it a leaf spring 45, the end of which is bent to engage the serrations on the edge of the disk 31. By this arrangement the various disks may be displaced relatively to one another but the springs 45 hold them fairly securely in place with respect to one another when set at the desired positions with respect to one another. The disks may carry scales on their edges, as indicated in Fig. 1, which scales may indicate the number of seconds it will take for the disk to rotate given distances when driven by the clock arrangement.

The contact arm 41 is carried on an insulating support 46 and is electrically connected with a battery 47 or other source of electrical energy, the other side of the battery being connected with the magnet 16 and the other terminal of the magnet 16 being connected to the metal base 22, which in turn is electrically connected through the metal parts of the contact device 24 to the various electrical contacts 37, 38, 39 and 40. 48 represents a slide which when pressed by the hand of the operator engages the escapement wheel 49 so as to stop the clock arrangement. When the slide 48 is pulled outwardly the clock arrangement is permitted to drive the timing arrangement.

In operation the operator will first push the shutter 4 upwardly by hand until it occupies the position shown in Fig. 1 with the focusing opening *xxx* opposite the lens 3. The object to be photographed is then focused. Then the disks of the contact arrangement 24 of the timing arrangement are adjusted to various positions relative to one another, so that when set in operation it will take a certain number of seconds when driven by the clock arrangement for the contact 38 to come into contact with the brush contact 41 after the contact 37 has left the same; also so that it will take a certain number of seconds for the contact 39 to reach the brush contact 41 after the contact 38 has left the same; also so that it will take a certain number of seconds for the contact 40 to reach the brush 41 after the contact 39 has left the same, it being understood that after the disks are so adjusted they rotate together as though fixed to one another, although they are only held together by frictional engagement. The number of seconds which it takes for the various contacts to reach the brush 41 is adjusted in accordance with the time it is desired that the exposure be made through the various stop openings 5, 6, and 7. The operator having adjusted the camera to the desired focus, then with the hand presses down the armature 15 so as to remove the dog 11 from the notch 18. This permits the shutter 4 to drop until the dog 13 engages the notch 17. The operator then releases the armature 15, whereupon the dog 11 engages the notch 19 to hold the shutter in such position that a blank space thereof will be opposite the lens. The plate or other sensitive photographic agent may then be placed in the camera in the usual way and when all is ready the slide 48 is moved outwardly to set the clockwork in motion.

The clock being set in motion it drives the disk 27 which in turn drives the various disks 31, 32, 33 and 34 together, bringing first the contact 37 in contact with the brush 41, whereupon the magnet 16 is momentarily energized to remove the dog 11 from the notch 19, thereby permitting the shutter 4 to drop until the stop opening 5 comes opposite the lens 3, whereupon the dog 13 will engage the notch 18 to prevent the shutter from dropping further. Immediately the magnet 16 becomes deënergized by separation of the contacts 37 and 41 the dog 11 is moved inwardly to engage the notch 20 to hold the stop opening 5 opposite the lens 3. After the desired number of seconds have elapsed for the exposure to take place through the stop opening 5 the contact 38 will have arrived at the brush 41 and made contact therewith to again energize the magnet 16 and in a similar manner cause a further drop of the shutter 4 to bring the stop opening 6 opposite the lens by reason of the dog 13 engaging the notch 19 and after the separation of the contacts the dog 11 engaging the notch 21. After the exposure has taken place the desired number of seconds or other length of time through the stop opening 6 the contact 39 will have come in contact with the brush 41 to again release the shutter, the dog 13 engaging the notch 20, and upon separation of the contacts the dog 11 engaging the notch 50 so that the still smaller stop opening 7 is brought and held opposite the lens 3. After exposure has taken place the desired number of seconds through the stop opening 7 the contact 40 will have come in contact with the brush 41 so as to again release the shutter 4 and cause it to drop until the dog 13 engages the notch 21 and upon separation of the contacts the dog 11 will engage the notch 50 and thus cause the blank space to be brought opposite the lens 3 so as to discontinue or shut off the exposure. If desired this last movement of the shutter may be made to cause the ringing of a bell or the giving of a signal in any suitable or well known manner in order that the operator may know that the exposure is complete. If desired the operator may then move the slide 48 so as to bring it in engagement with the escapement wheel 49 to stop the clock arrangement. The apparatus may then be set for another exposure which will be automatically timed in the desired manner, as above set forth.

It will be seen from the above that the apparatus described forms a simple and efficient arrangement by which a shutter is provided adapted to produce exposures through stop openings of different sizes and mechanism coöperates therewith for automatically gradually changing or reducing the size of the stop opening during a single exposure as the exposure continues or at predetermined intervals responsive to the lapse of time during the exposure. Also by the arrangement of the disks 31, 32, 33 and 34 by which they may be manually adjusted about their axes relatively to one another the intervals of time at which the stop opening changes may be varied as desired so that the total length of exposure may be varied as desired, and also the length of exposure through each of the stop openings of different sizes may be varied as desired, so that the rate at which the decrease in size of the stop opening takes place may be varied at will for any exposure, and will automatically take place as set. It will further be seen that the apparatus automatically finally discontinues the exposure as well as automatically starts the exposure.

While I have shown for the purposes of more simply illustrating my invention, a shutter of the slide type having a plurality of stop openings of different sizes it will be readily understood by those skilled in the art that my invention may be efficiently applied to all kinds of shutters including those of the iris diaphragm type. Also many other modifications and changes may be made in the apparatus shown and described, without departing from the spirit and scope of my invention in its broader aspects, hence I do not desire to be limited to the details shown and described, except as specifically set forth in the appended claims.

Having fully and clearly described my improvements what I claim as new and desire to secure by Letters Patent is:

1. In a device of the character described, the combination of a shutter proper having a plurality of stop openings of different effective sizes and adapted to expose a sensitized surface through said stop openings, and mechanism for operating the same to cause the sensitized surface to be exposed through one and then through another of said stop openings during the exposure operation.

2. In a device of the character described, the combination of a shutter device proper having a plurality of openings of different effective sizes and adapted to expose a sensitized surface through said openings, mechanism for automatically shifting said shutter to bring one and then another of said stop openings in position to expose the sensitized surface during the exposure operation, and means for varying the intervals of time at which the stop openings are shifted.

3. In a device of the character described, the combination of a shutter proper having a plurality of stop openings of different effective sizes and adapted to expose a sensitized surface through said stop openings, mechanism for automatically shifting said shutter during the exposure operation to bring one and then another of said stop openings in position to expose the surface, said mechanism being responsive to the lapse of time during the exposures, and means for varying the intervals of time at which the stop openings are shifted.

4. In apparatus of the character described, the combination of a shutter proper having openings of different effective sizes and adapted to expose a sensitized surface through said openings, and means operating said shutter to cause a series of exposures to be made through said openings, each being made through a different stop opening and continuing through each different stop opening for a definite length of time.

In testimony whereof, I have signed my name to this specification.

HARRY C. JONES.